United States Patent [19]

Gilliland

[11] Patent Number: 4,467,174
[45] Date of Patent: Aug. 21, 1984

[54] REMOTE CONTROL OF OPEN CIRCUIT VOLTAGE IN A WELDING POWER SUPPLY

[76] Inventor: Malcolm T. Gilliland, 310 Pine Valley Rd., Marietta, Ga. 30060

[21] Appl. No.: 483,811

[22] Filed: Apr. 11, 1983

Related U.S. Application Data

[62] Division of Ser. No. 236,037, Feb. 19, 1981, Pat. No. 4,392,045.

[51] Int. Cl.³ .................................................. B23K 9/10
[52] U.S. Cl. .................................... 219/132; 219/130.1
[58] Field of Search ............................... 219/132, 130.1

[56] References Cited

U.S. PATENT DOCUMENTS

| | | | |
|---|---|---|---|
| 2,642,515 | 6/1953 | Bagg | 219/132 |
| 2,872,566 | 2/1959 | Leppala | 219/132 |
| 3,308,265 | 3/1967 | Hobart | 219/131 |
| 3,477,005 | 11/1969 | Weems | 219/132 |
| 3,549,978 | 4/1969 | Stearns | 321/19 |
| 3,683,149 | 8/1972 | Mayes et al. | 219/137 |
| 3,883,714 | 5/1975 | James | 219/131 |
| 3,912,980 | 10/1975 | Crump et al. | 317/31 |
| 4,247,752 | 1/1981 | Stringer | 219/130.33 |

FOREIGN PATENT DOCUMENTS 2135780 12/1972 France ............................... 219/132
883052 11/1961 United Kingdom ............... 219/132

OTHER PUBLICATIONS

Chapter 9 "AC Phase Control," GE SCR Manual, 5th Edition, ©1977.

*Primary Examiner*—C. C. Shaw
*Attorney, Agent, or Firm*—Jones & Askew

[57] ABSTRACT

A three-phase thyristor (42, 43) controlled welding output supply requiring only a single firing pulse of short duration per phase per half cycle is shown. Once a firing pulse has been provided (122), a holding impedance (40) connected between the output electrodes (32, 34) is provided to the neutral terminal (18) of a wye wound secondary (17) to provide a path for holding current independently of the load presented by the arc. An improved firing control circuit includes in addition to the normal firing capacitor (82), a negative phase angle impedance (86, 87, 88) attached to one end of a conventional breakdown device (117) used to fire a master thyristor gate (119). Stepped up voltage (60) is provided to the control circuit for greater noise immunity. Also shown is a remote control (151) for controlling a reversible motor (150) to drive through a slip clutch (140), the main voltage controlling variable impedance (80).

2 Claims, 5 Drawing Figures

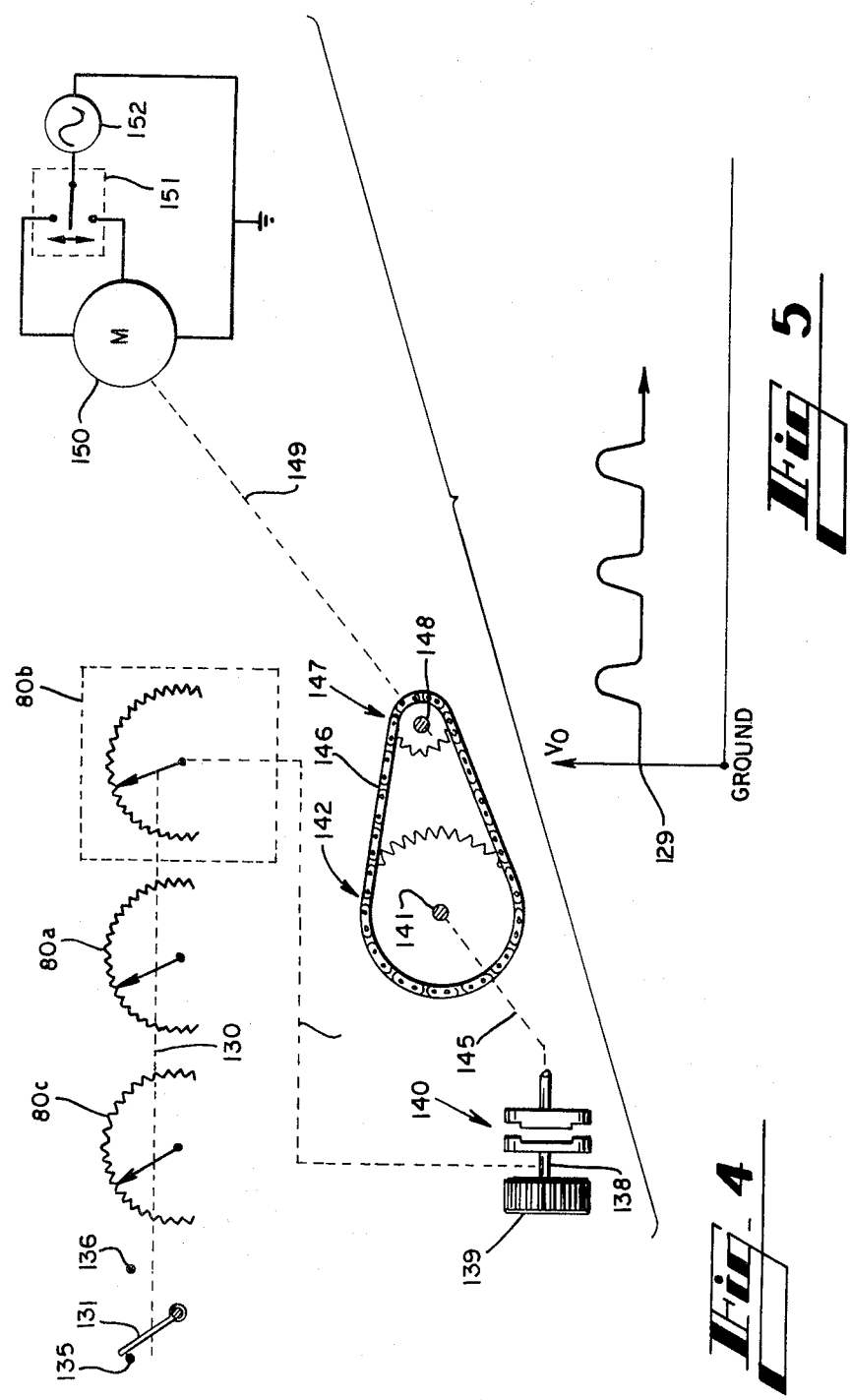

REMOTE CONTROL OF OPEN CIRCUIT VOLTAGE IN A WELDING POWER SUPPLY

This application is a division of application Ser. No. 236,037, filed Feb. 19, 1981, entitled "Improved Thyristor Controlled Welding Power Supply" now U.S. Pat. No. 4,392,045.

TECHNICAL FIELD

The present invention relates to solid state power supplies and more particularly to a high current low voltage thyristor controlled supply adapted for arc welding purposes.

BACKGROUND OF THE INVENTION

The present invention relates to improvements in solid state power supplies for remote welding operations. In typical applications, a welding power supply will be provided at one location with a long run of cable and a shielding gas line to a remote unit including a wire feeding arrangement and controls for the welder to use at the situs of the weld. A typical application might be a shipyard in which a welder is required to carry the remote welding unit to a plurality of locations for performing arc welding.

Typically, such a power supply is designed for high currents at a relatively low open circuit voltage with typical parameters being a supply for currents on the order of six hundred amperes at open circuit voltages of twenty to forty volts.

Depending on the type of weld being made, the particular shielding gas in use, and various other factors, it is necessary to be able to adjust the open circuit voltage of the welding power supply in use. Previous systems have incorporated variable autotransformers for controlling the output voltage. Such autotransformers dissipated large amounts of heat and were common failure points in such prior art systems.

More recently, solid state AC phase control power supplies using thyristors such as silicon controlled rectifiers (SCRs) and triacs have been used in arc welding applications.

As is known to those skilled in the art, the thyristors used for output voltage and current control in such power supplies are solid state devices having three or more pn junctions wherein a relatively small current at an input terminal called the gate is used to control large currents between the main terminals of the device. The volt-amp characteristics of such devices display a well known sensitivity of the forward breakover voltage required to initiate conduction to gate current.

It is also known that once such a thyristor device is in a conducting state, the internal mechanism which maintains it in its on state is an internal positive feedback provided within the device. When the current through the device (for a particular gate current) drops below a certain level, insufficient current is available to maintain the internal positive feedback and the thyristor will cut off.

It will further be appreciated by those skilled in the art that when an arc is struck by the welder using such a supply, the arc may represent a load on the order of miliohms to the power supply and loss of the arc represent a substantially open circuit. Thus it will be appreciated that the load on the power supply varies greatly in magnitude and quite rapidly when the supply is in use and thus the supply encounters transient variations in current drawn therefrom of large magnitude and short duration.

It is further known to those skilled in the art that in any typical welding application, the environment in which a power supply will be used is subject to extremely high electrical noise levels, many of which are transient in nature and contain large amounts of high frequency energy.

Since relatively small currents into the gates of control thyristors, on the order of less than one amp, are used to control several hundred amperes between the main terminals of such thyristors, and since in its normal environment the output current from welding power supplies varies greatly and rapidly, the main problems encountered in design of solid state thyristor controlled power supplies have included: reliable gate triggering, without spurious triggering due to noise; and maintaining conduction of the thyristor once it is turned on the presence of rapidly varying loads presented to the supply by the arc or termination of the arc.

Prior art solid state welding supplies known to the inventor have used a large number of components in control circuits for controlling the firing pulses to the gates of the main control current thyristors. Typically such circuits will be complex and use a large number of components including integrated circuit operational amplifiers and discrete transistors. In the typical arc welding environment, emitter-base breakdown of transistors has been a common failure point in the control circuits. Furthermore, such previous solid state power supplies have generally had rather complex control circuit for which field repair was difficult. Replacement of high component count circuit boards was often more feasible than repair of the individual boards.

Furthermore, in previous solid state welding power supplies, the problem of maintaining conduction of a thyristor, once triggered in the presence of widely varying loads (and thus widely varying currents through the thyristor) has generally been approached by providing either a plurality of firing pulses in order to maintain conductivity of the thyristor during any one cycle or half cycle of the input voltage, or arrangements for maintaining relatively large amounts of gate current or gate pulses of long duration in order to reduce the holding current of the thyristor to a minimum when conduction is desired.

SUMMARY OF THE PRESENT INVENTION

The present invention provides a simplified low part count solid state thyristor controlled welding power supply which overcomes the above noted drawbacks of the prior art. The power supply is particularly adapted to be used in typical multiwelder remote welding locations which include the high noise environments noted hereinabove. It is particularly useful with remote control systems of the type shown in U.S. Pat. No. 4,119,830 to the inventor of the present invention.

The present invention provides the improvements which overcome the drawbacks of the prior art by providing a simple thyristor controlled power supply which requires only one firing pulse per cycle per thyristor and provides a path for current from the output of the supply to a neutral terminal which maintains sufficient current through the triggered thyristor to make sure that current through the thyristor does not fall below the holding current until an appropriate point in the half cycle of conduction where the voltage nears zero and it is desired to shut off the thyristor.

In its preferred form the invention includes a three-phase full wave bridge implemented by a pair of SCRs for each phase in which each SCR receives one triggering pulse per cycle at an appropriate firing angle for the output voltage desired.

Furthermore, the present invention provides a simplified firing control circuit which is free of transistors and may be implemented only with resistors, capacitors, diodes, and a breakdown device such as a bilateral switch.

Furthermore the improved simplified control circuit of the present invention provides greater immunity to spurious firing than triggering control circuits known heretofore.

One of the improvements in reliability of the present invention is achieved by using a higher voltage in the triggering control circuit than those that have been used in the past in order to elevate the absolute value of the voltages within the control circuit which are required to trigger the main control thyristors and thus to make the system more immune to noise when in use.

In its preferred form the present invention uses conventional three-phase input and provides an individual firing control circuit for each phase with each of the circuits being independently adjustable. This arrangement allows not only interchangeability of control circuits in the field, but provides a very simple arrangement for providing a pulse arc power supply when desired.

The present invention also provides a dependable and inexpensive arrangement for varying the open circuit voltage of the supply from the remote location by the welder.

Thus it is an object of the present invention to provide an improved solid state high current low voltage welding power supply.

It is also an object of the present invention to provide a simplified control circuit for the firing of current control thyristors which includes no transistors, provides only one pulse per thyristor per half cycle, and exhibits greater noise immunity and dependability than such control circuits heretofore known.

It is a further object of the present invention to eliminate the most common failure points of previous welding power supplies including variable autotransformers and transistors.

It is still a further object of the present invention to provide a thyristor controlled high current output requiring only one short firing pulse per phase per half cycle and which assures continued conduction of the thyristor for the remaining desired portion of the half cycle regardless of the load at the welding point.

It is a further object of the present invention to minimize the part count in the control circuits and provide control circuits which are easy to repair and readily switchable between characteristics for $CO_2$ MIG welding applications and other welding applications.

It is a further object of the present invention to provide a solid state welding supply which is easily adjustable between configurations for constant voltage output to a pulse arc power source.

It is a further object of the present invention to provide an improved voltage adjustment arrangement which may be adjusted remotely by the user.

That the present invention overcomes the above-noted drawbacks of prior welding power supplies as well as accomplishing the above-stated objects of the invention will be appreciated from the detailed description of the preferred embodiment below.

BRIEF DESCRIPTION OF THE DRAWINGS

FIG. 4 is a diagram of the improved remote control voltage varying circuit of the preferred embodiment.

FIG. 5 is a voltage diagram showing desired output for a pulse arc welding source.

DETAILED DESCRIPTION

Figure 1:
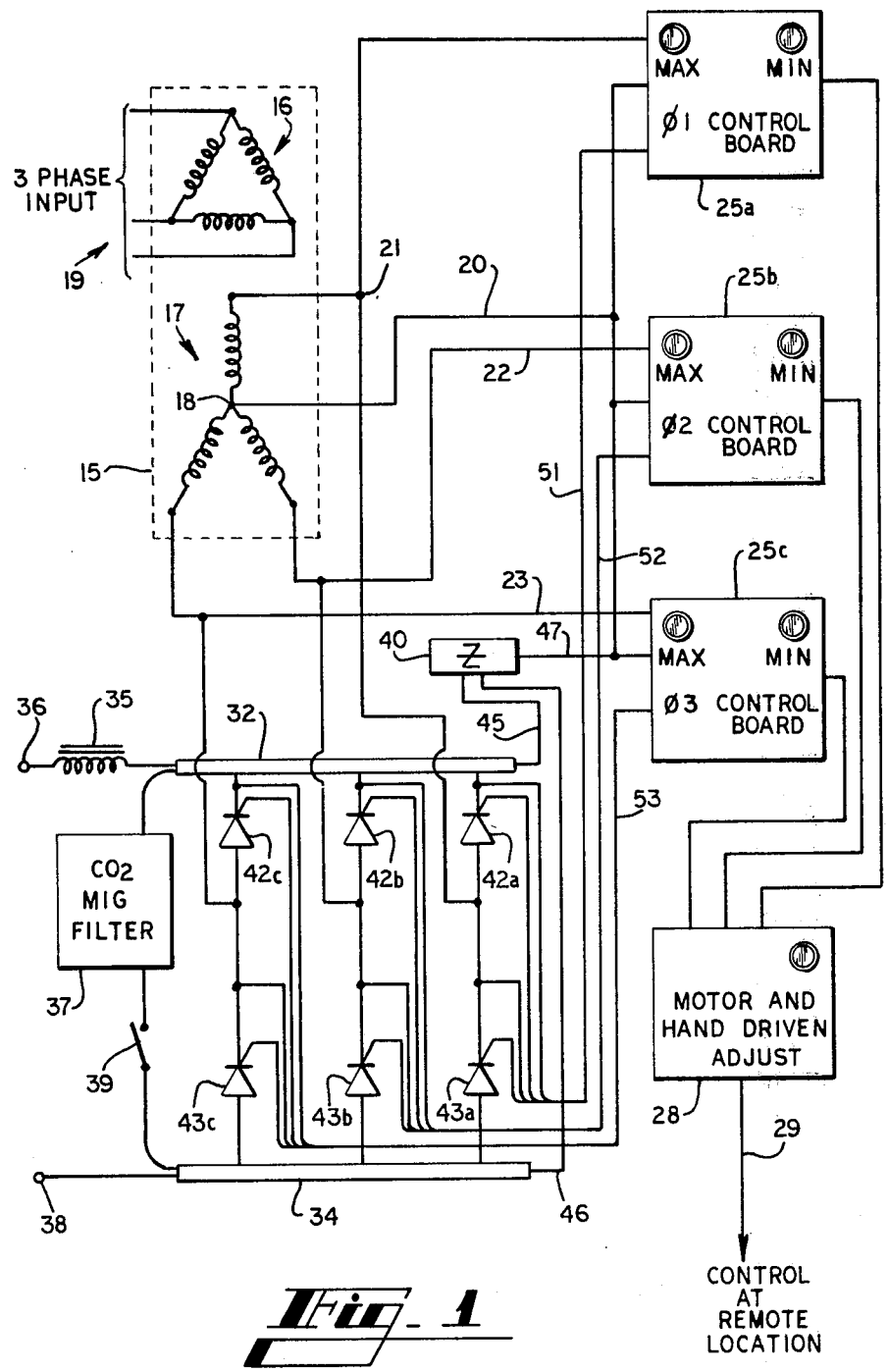
FIG. 1 is a block diagram of the preferred embodiment of the present invention.

Turning now to the drawings, in which like numerals reference like elements, the preferred embodiment of the present invention will be described. The preferred form of the present invention is a DC power supply derived from a three-phase AC input, normally of 460 or 230 volts. As shown in FIG. 1, a transformer 15 including a delta connected primary 16 and a wye connected secondary 17 steps down the three-phase AC input shown at 19 to provide three output phases which appear on lines 21, 22 and 23 at approximately 40 volts per phase. The wye wound secondary is selected so that the neutral terminal 18 of the secondary is available to be attached to conductor 20. Neutral conductor 20 is connected to each of three independent and preferably identical control boards 25a–25c, each of which is provided with an input of one of the phases of secondary 17. It should be understood that control boards 25a–25c control the output of the supply from each of the three phases.

Each of output phases 21–23 are connected to a pair of main control silicon controlled rectifiers 42 and 43, one pair for each phase. Each phase of the secondary is connected at a junction point between the cathode of SCRs 43 and the annode of SCRs 42 and conduct current between a positive output electrode 32, a negative output electrode 34 and each phase of secondary 17. It should be understood that in the preferred form, electrodes 32 and 34 comprise a heavy gauge copper conducting bridge for carrying the high current densities provided in use.

Positive output electrode 32 is connected through filtering inductor 35 to positive output stud 36. Negative output electrode 34 is connected to negative grounded output stud 38. It should be appreciated that studs 36 and 38 are conventional in nature and provide the connection point for the remote welder at the power supply.

Between output electrodes 32 and 34 is a filtering arrangement shown as 37 particularly adapted for $CO_2$-MIG (metal inert gas) welding. Filter arrangement 37 may be selectively connected and disconnected between the bridge comprising electrodes 32 and 34 by a selectively operable connection means indicated as 39 in FIG. 1.

The output electrodes 32 and 34 are connected by conductors 45 and 46, respectively, to a holding impedance 40 which is connected by line 47 to neutral conductor 20 returning same to neutral terminal 18 of secondary 17 of transformer 15.

The gate and cathode terminals of each pair of thyristors 42 and 43 for each phase are connected via a generalized connection shown as 51, 52, and 53 for each respective phase to control boards 25a–25c. The nature of control lines 51–53 will be described in further detail hereinbelow.

Also connected to each of control boards 25 is a motor and hand driven adjustment arrangement shown as 28 for controlling the output voltage of each phase. A line shown as 29 indicates that adjustment arrangement 28 may be adjusted remotely by the user of the power supply.

Figure 2:
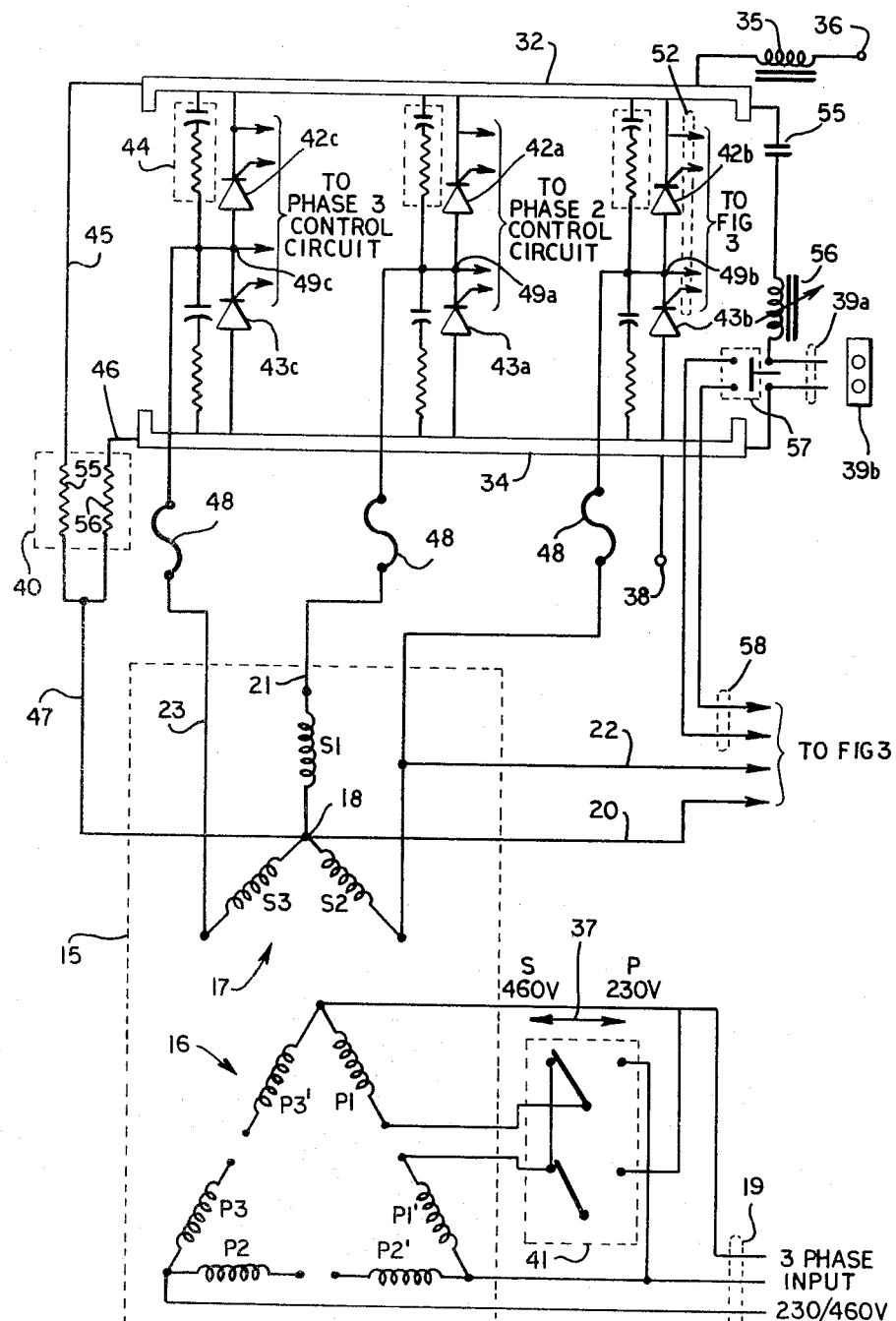
FIG. 2 is a schematic diagram of the input and main current control bridge of the preferred embodiment.

Turning next to FIG. 2, details of the bridge arrangement for the main control SCRs will be described. Three-phase input of either 230 or 460 volts is provided at input 19 shown in FIG. 2. As may be seen in FIG. 2, the preferred form of primary 16 includes split windings for each phase shown as P1 and P1' through P3 and P3'.

In the preferred embodiment of the present invention it is desired to be able to switch the split portions of the windings of primary 16 between series and parallel connections in order to make the power supply readily adaptable to 460 and 230 volt inputs. As may be seen in FIG. 2, a switchable connection shown as double pole double throw switch 41 provides this switchable arrangement. It is to be understood that similar switching arrangements to switch 41 are provided for phases 2 and 3 but only the arrangement for phase 1 is shown for convenience.

Arrow 37 indicates that when the terminals of switch 41 are in a position indicated by the lefthand end of the arrow, the split windings are connected in series and appropriate for 460 volt inputs at 19.

When switch 41 is in the position shown by the righthand side of arrow 37, windings P1 and P1' are connected in parallel and a 230 volt input at 19 is appropriate.

While shown in the drawing as a switch, it is preferred to make the connection arrangement for the split windings via jumper connections.

Secondary 17 is a wye wound arrangement having a neutral terminal 18. The outputs of each phase, 21–23, respectively, are connected through fuses 48 to junction points 49a–49c.

As may be seen from inspection of FIGS. 1 and 2, the preferred form of the present invention uses a pair of SCRs 42 and 43 for each phase of the output of secondary 17. In the arrangement shown it will be readily appreciated that the connections of the phase outputs at junction point 49 between the cathode of SCRs 43 and the anode of SCRs 42 causes these SCRs to provide full wave rectification in addition to the current controlling feature. However, it will be readily apparent that rectification may take place prior to provision of current to current controlling thyristors 42 and 43 and thus the present invention should not be limited to the particular arrangement shown.

Furthermore it is possible to effect embodiments of the present invention using other current controlling thyristors such as triacs and the like. Thus it will be appreciated that each of the pairs of thyristors 42 and 43 comprise a pair of thyristors connected in series between positive output electrode 32 and negative output electrode 34 and are connected in series with each other at a junction point 49. A snubbing impedance 44 consisting of a five ohm register and a 0.47 microfarad capacitor is attached between each phase and electrodes 32 and 34.

Each of the gate and cathode terminal pairs of SCRs 42 and 43 are individually controlled for each phase, they are controlled independently and identically and therefore description of control of one of pairs 42 and 43 will suffice to describe control of all.

In FIG. 2, control connection 52 (as was shown in FIG. 1) is brought out it will be described further in connection with FIG. 3. It will be readily apparent from the connection of SCRs 42b and 43b that, when the output of phase 2 of the secondary 17 shown on line 22 is positive with respect to neutral terminal 18 (and appropriate firing pulses are provided), SCR 42b will conduct current from line 22 through SCR 42b to positive output electrode 32 and from thence to positive output stud 36 on through the arc at a remote location (not shown) which includes a return to negative electrode 34 via stud 38.

When the phase two output on line 22 is negative with respect to neutral terminal 18 (and a firing pulse is provided) SCR 43b will conduct and current will flow from positive output stud 36 through the arc (not shown) back to negative stud 38, through SCR 43b to junction 49b and back through conductor 22 into a phase two winding (S2) of secondary 17. Thus, the bridge arrangement shown provides both current control and full wave rectification in a known manner.

As will become apparent from the description of FIG. 3 hereinbelow, during each half cycle of each phase, a single pulse is provided to each of control connections 51–53. Continuing with the example of phase 2, one pulse is provided between the gate and cathode pairs shown as 52 on FIG. 2. The particular firing angle of each pulse on each half cycle will determine the open circuit voltage which will appear between studs 36 and 38. It will readily be appreciated from inspection of the bridge arrangement of FIG. 2 that while a pulse is provided to both gate to cathode junctions of SCRs 42b and 43b, only one of the SCRs will be forward biased during any half cycle and therefore only one will conduct for any given half cycle.

One of the most useful improvements and novel features which aids in providing the simplicity of the present invention is holding impedance 40 which may be seen to comprise resistors 55 and 56 in the preferred embodiment. Note that positive output electrode 32 is connected via line 45 to resistor 55, the other end of which is connected to conductor 47 which returns to neutral terminal 18. Similarly, negative output electrode 34 is connected through line 46 and resistor 56 to conductor 47.

In the preferred embodiment, resistors 55 and 56 are each of a value of 2.5 ohms.

As was noted hereinabove, during use of the supply the load presented across the conducting bridge between output electrodes 32 and 34 varies rapidly when the welding arc is struck and extinguished. Consider for example that a welding arc when struck may represent a load on the order of tens of miliohms shunting the output electrodes. When the arc is extinguished, an open circuit would be presented between electrodes 32 and 34 in the absence of holding impedance 40. Thus, with no arc in existence, in the absence of holding impedance 40, none of thyristors 42 or 43 could maintain their conduction state once triggered, because there is no path for current sufficient to provide the necessary holding currnet to maintain these devices in their on state. Therefore, it would be virturally impossible to read an open circuit voltage in so simple an arrangement without holding impedance 40. Furthermore, the arc represents a rapidly varying load in use and a simple arrangement such as the present invention providing only one firing pulse per half cycle would result in momentary values of current during each half cycle through each SCR which, in practice, will drop below the holding current thus extinguishing conduction of each SCR at an inappropriate time during the half cycle.

However, the inclusion of resistors 55 and 56 in the present invention provides a path for holding current which is independent of the load at the arc between studs 36 and 38 and thus assures that once each of SCRs 42 or 43 is fired during a half cycle, sufficient holding current will be drawn through lines 45 and 46 to maintain conduction of the SCR until the voltage between the respective phase of secondary 17 and neutral terminal 18 drops to an appropriate point. In the preferred form, it has been found that SCRs 42 and 43 should not be cut off until the voltage of the respective phase they control is less than 10% of the open circuit voltage between output electrodes 32 and 34 in order to maintain proper operation. The best mode of operating the present invention is one in which the cutoff point with a magnitude of each phase to neutral voltage is even less than this.

The values of resistors 55 and 56 are selected so that once the appropriate cutoff point in each phase voltage is determined, the value of resistors 55 and 56 may be determined by noting that the product of this resistance and ohms times the maximum rated holding current of SCRs 42 and 43 will provide a value in volts equal to the magnitude of the cutoff point for each SCR.

For example, in the preferred embodiment typical values for holding current for SCRs 42 and 43 are on the order of 750milliamps for SCRs which will conduct approximately 700 amperes RMS. Since the approximate minimum open circuit output voltage to be used in the present invention is on the order of 20 volts, it is preferred to have the cutoff point of each phase be less than 10% of this value or less than 2 volts. It follows from ohms law that the 2.5 ohm value for resistors 55 and 56 for SCRs 42 and 43 having holding currents of 750 milliamps indicates that the voltage between each respective phase and neutral terminal 18 must drop to approximately 1.88 volts before the SCR is cut off.

Thus it will be appreciated that holding impedance 40 provides a holding impedance means wich connects output electrodes 32 and 34 to neutral terminal 18 which draws a holding current through one of the members 42 or 43 of each pair of thyristors associated with each respective phase subsequent to provision of a triggering pulse on one of control lines 51-53 which will maintain the holding current through the SCR until the voltage between the respective phase and the neutral terminal substantially returns to zero.

As indicated hereinabove, the present inventor encountered indications in the literature that a holding current could be maintained in this manner but the same references indicated that such was impractical. However, it will be readily appreciated from the description of the preferred embodiment that with a maximum open circuit voltage between electrodes 32 and 34 on the order of 40 volts, each of resistors 55 and 56 will be required to dissipate only something in excess of 600 watts which is a nominal amount of dissipated power in an approximately 25 kilowatt supply such as the preferred embodiment.

From the foregoing, it should be appreciated that the use of holding impedance 40 to maintain holding current through SCRs 42 and 43 provides an arrangement for a thyristor controlled welding power supply which need only provide firing pulses once per half cycle at the appropriate firing angle in order to assure proper maintenance of conduction of the thyristors throughout the remainder of the half cycle.

Another improvement in solid state welding supplies of the present invention is shown in its preferred form on FIG. 2. This improvement is an arrangement particularly adapted for $CO_2$MIG (metal inert gas) welding which, as will be appreciated by those skilled in the art, has special requirements. In $CO_2$MIG welding a more stable, or better filtered, supply is required over that which may be used with other types of shielding gas such as argon. Also, a lower voltage across the arc is used. In $CO_2$MIG welding, the welder will repeatedly strike and extinguish the arc during the welding process which provides the main need for the increased filtering of the supply. In other types of welding the critical filtering required for $CO_2$MIG welding is not necessary and thus it is desirable to be able to load the additional filtering elements only when they are required.

The particular arrangement of the preferred embodiment for $CO_2$MIG welding comprises capacitor 55 and inductor 56 together with selectively operable connecting means 39, which preferably comprises removable link 39b which may be attached across conducting posts 39a. It may be seen from FIG. 2 that when link 39b is connected between posts 39a capacitor 55 and inductor 56 are connected in series across output electrodes 32 and 34.

In the preferred embodiment, capacitor 55 is of a very high value on the order of 240,000 microfarads preferably embodied by four 60,000 microfarad computer grade capacitors connected in parallel. A capacitor of this size is necessary to provide adequate filtering for $CO_2$MIG welding and adequate dissipation factors within the capacitor to avoid straining same.

It was found by the inventor that the provision of a capacitance of this magnitude, while providing adequate filtering for $CO_2$MIG welding, tended to cause low frequency oscillations of a magnitude of several volts in the open circuit voltage between electrodes 32 and 34. It is believed that these oscillations were due to a complex inneraction between capacitor 55 and the inductance of the coils of secondary 17. These oscillations manifest themselves as periodic deflections of the open circuit voltage meter (not shown) which made it difficult to ascertain the open circuit voltage to be used when trying to adjust same.

The inclusion of inductor 56 in series with capacitor 55 was made to damp out these internal oscillations.

Interposed in the path of connecting link 39b when it is placed over conducting post 39a is a momentary pushbutton switch 57. When conducting link 39b is secured to posts 39a, momentary switch 57 is held in a position with its contacts closed and thus a closure occurs between the pair of contact leads shown as 58. As will be explained in detail hereinbelow in connection with FIG. 3, the closure across leads 58 provides for an automatic reduction in the open circuit voltage between output electrodes 32 and 34 whenever the $CO_2$MIG welding link 39b is attached to post 39a. Thus it will be appreciated that post 39a and link 39b provide a selectively operable connecting means for connecting a reactive impedance comprising capacitor 55 and inductor 56 between positive output electrode 32 and negative output electrode 34. It will further be appreciated that switch 57 comprises a control means which is connected to an adjusting arrangement shown in detail in FIG. 3, which automatically causes reduction of the open circuit voltage between electrodes 32 and 34 when link 39b is in place.

Figure 3:
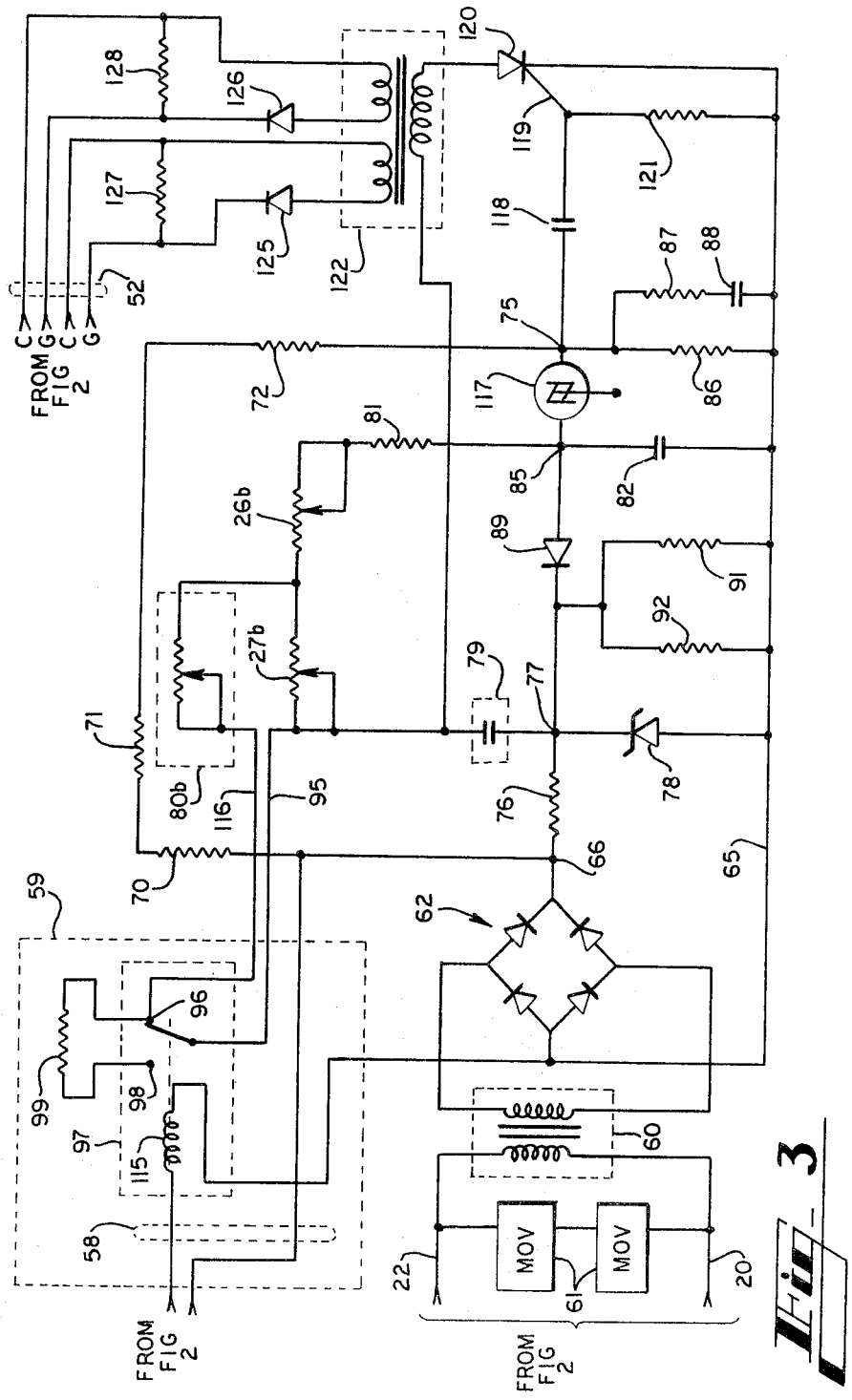
FIG. 3 is a schematic diagram of the preferred embodiment of the control circuit for firing the main thyristors for one phase of a multiphase supply according to the present invention.

Turning next to FIG. 3, one of control boards 25a-25c (FIG. 1) is shown in detail. It should be understood that each of these control boards is identical in the preferred embodiment.

To provide an example, a control board 25b is considered to be connected to control lines 52 shown in FIG. 1. The preferred form of the control board is shown in FIG. 3. It should be appreciated that all components shown on FIG. 3 will appear identically in each of control boards 25a-25c (FIG. 1) except those shown within dashed block 59 which, in part, are common to a single board associated with the supply.

Turning now to FIG. 3, the main input to the control board is the phase voltage for the particular phase controlled by the board, in the example shown, phase 2 of the secondary 17 of transformer 15 (FIGS. 1 and 2).

Thus, neutral conductor 20 attached to neutral terminal 18 (FIG. 2) is connected to one side of the primary of a step up transformer 60 with the other side connected to the phase 2 output line 22. The input to transformer 60 is surge protected by a pair of surge suppressing MOVs 61.

The secondary of transformer 60 is connected to a conventional full wave bridge shown as 62, the output of which is provided between a negative or a local ground on 65 and a positive output at 66. It should be appreciated that the voltage between terminals 66 and 65 will be proportional to the full wave rectified output of the phase 2 voltage appearing between conductors 22 and 20.

As noted above, transformer 60 is a step up transformer and provides an increased voltage level in the control circuit shown on FIG. 3 over that available at the particular phase appearing between conductors 22 and 20. The use of a step up transformer in the control circuit to increase the voltage in the control circuit for each phase provides one of the primary benefits of the present invention which is believed to be novel. While an additional transformer, such as transformer 60, adds increased cost to the system, the use of higher voltage levels within the control circuit provides a much greater noise immunity in the control circuit than has heretofore been known and is believed to be responsible in part for the benefits of the present invention.

It is considered important that the voltage at the secondary of transformer 60 be at least twice the magnitude of the input phase voltage between conductors 20 and 22 in order to achieve the improvement provided by the present invention. However, it is preferred, and considered to be the best mode of operating the present invention, to have the step up ratio provided by transformer 60 to be even higher. In the preferred embodiment, full wave rectified 110 volt AC is used between points 66 and 65.

It will thus be appreciated that transformer 60 which provides input to the control circuit of FIG. 3 is a control circuit input transformer means connected to secondary 17 (FIG. 1) which provides a control circuit input voltage between points 66 and 65 which is at least twice the magnitude of the phase input voltage between conductors 22 and 20.

The operation of the firing control circuit shown in FIG. 3 may best be appreciated by considering that it is the charging of capacitor 82 to a predetermined level which ultimately initiates the firing pulses to SCRs 42 and 43 (FIG. 2).

As may be seen on FIG. 3, the charging of capacitor 82 raises the voltage level at point 85 and, when a predetermined voltage exits between points 85 and 75, silicon bilateral switch 117 breaks down and begins conducting current which allows a firing pulse to be provided through capacitor 118 to the gate 119 of master SCR 120.

The preferred structure of the control circuit shown in FIG. 3 for controlling firing is provided through two resistive legs to points 75 and 85. The first leg comes from the positive rectified input at point 66 through resistor 76 to point 77, the maximum voltage of which is limited by forty-three volt zener diode 78. A set of relay contacts shown as 79 is interposed between point 77 and the remainder of this resistive leg. It should be appreciated that contacts 79 are controlled by a coil (not shown) operated by a trigger switch (not shown) closure of which turns on the power at the remote location. Thus, contacts 79 operate in a manner analogous to the contactor of a conventional welding power supply. When contacts 79 are closed, the first resistive leg continues through a control circuit comprising potentiometers 26b, 27b, and 80b and then through resistance 81 to point 85 where capacitor 82 is charged.

The second resistive leg of the control circuit of FIG. 3 originates at point 66 and may be followed through resistances 70, 71 and 72 to point 75.

Considering for a moment the voltage output control adjustments which are provided by potentiometer 26b, 27b and 80b, it should be noted that potentiometer 26b and 27b correspond to the controls shown on FIG. 1 for maximum output voltage and minimum output voltage, respectively.

Since the total resistance between points 77 and 85 controls the charging rate of capacitor 82, it will be appreciated that variations in these three potentiometers vary the charging rate of capacitor 82 and thus vary the firing angle at which SCR 120 is triggered. Potentiometer 80b is one element of a three element ganged potentiometer, all the elements of which are operated on a concentric shaft (not shown) to vary the output voltages from the respective phases. To adjust for the maximum output voltage, potentiometer 80b is operated until it completely shunts with a short circuit potentiometer 27b. When this condition is present, adjustment of potentiometer 26b sets the maximum output voltage by determining the minimum charge time for capacitor 82 which thus minimizes the firing angle for SCR 120.

When this adjustment has been accomplished, control potentiometer 80b should be adjusted to where its maximum resistance appears in shunt across potentiometer 27b which is then adjusted to set the minimum output voltage available from operation of potentiometer 80b. Under this condition the minimum voltage will be provided when the parallel combination of 27b and 80b in series with 26b and resistance 81 will have the largest possible value for any setting of potentiometer 80b.

Thus it will be appreciated that the maximum and minimum output voltages may be individually set by potentiometers 26b and 27b, respectively. Variations between the maximum and minimum, once set, are obtained by adjustment of potentiometer 80b which should be understood to be ganged to similar potentiometers on the control boards for the other two phases.

As noted hereinabove, a breakdown device, preferably embodied as a silicon bilateral switch 117, provides firing pulses to point 75 through capacitor 118 to fire master SCR 120. In the preferred embodiment, point 85 must be approximately 8 volts positive with respect to point 75 before bilateral switch 117 breaks down and conducts.

During the declining portion of each half cycle of rectified output from point 66, diode 89 will become forward biased when the voltage at point 66, and thus point 77 approaches zero and therefore diode 89 provides a path through resistors 91 and 92 to discharge capacitor 82.

This arrangement for discharging capacitor 82 assures that at the initiation of each half cycle of four wave rectified voltage, capacitor 82 will be completely discharged (or to a level approximating the forward voltage drop of diode 89) so that no cycle skipping will occur in the firing of SCR 120.

Note that a reactive impedance comprising resistors 86 and 87 and capacitor 88 is connected between point 75 (to which the above cited second resistive leg is connected) and ground line 65. It has been empirically determined that the inclusion of a reactive impedance of the type shown greatly improves the reliability of the control circuit shown in FIG. 3. It is believed that capacitor 88, which is ten times the size of capacitor 118 in the preferred embodiment, helps absorb transients appearing in the control circuit and prevents an inrush of current into gate 119 in the presence of transients. Furthermore, in the preferred embodiment, it imperically has been determined that it is important for the impedance between point 75 and line 65 to have a lagging phase angle less than the 90° lag of phase angle provided by capacitor 82.

As will be appreciated by inspection of the values of the elements in the preferred embodiments set forth hereinbelow, the reactive impedance comprising resistors 86 and 87 and capacitor 88 preferably provides approximately a 30° lagging phase angle in the impedance presented between point 75 and line 65. Thus it will be appreciated that the circuit controlling gate 119 of SCR 120 includes a variable first resistance leg which connects the input voltage from point 66 to a firing control capacitor 82 at a first junction point 85. The circuit further comprises a second resistance leg comprising resistors 70-72 connected to the input voltage at 66 to an impedance comprising resistors 86 and 87 and capacitor 88 at a second junction point 75 with the impedance having a lagging phase angle of less than 90°. Silicon bilateral switch 117 is a breakdown device connected between the junction points 85 and 75 and conducts current when a predetermined voltage exists between the junction points with capacitor 118 providing capacitive coupling to a thyristor gate 119.

When a pulse is provided to gate 119 of SCR 120, SCR 120 fires and (still assuming contacts 79 are closed) provides a pulse at the output of pulse transformer 122. This pulse is rectified by diodes 125 and 126 and provided along control lines 52 to the gates and cathodes of SCRs 42b and 43b (FIG. 2). The secondaries of pulse transformer 122 are shunted by resistors 127 and 128 which are provided to protect the gate to cathode junctions of the main current control SCRs.

The particular terminal of one of SCRs 42b or 43b, either gate or cathode to which control lines 52 are connected, is shown by the letters C and G by the control lines in FIG. 3.

Note that it is immaterial which gate and cathode pair of lines 52 is connected to which of SCRs 42b or 43b since both devices receive pulses each half cycle but only the device which is forward biased conducts on any given half cycle.

While in the preferred embodiment a master-slave triggering arrangement is used with SCR 120 as the master and SCRs 42b and 43b as the slaves, it is possible to construct the embodiments of the present invention whereby the gates of SCRs 42b and 43b are directly triggered.

Turning now to block 59 shown on FIG. 3, it is to be recalled that portions thereof show elements which are common to the entire preferred embodiment AND are not repeated on each of individual control boards 25 (FIG. 1). Note that a pair of lines 58 IS provided in series with a coil 115 of relay 97 which in turn is in series with the 110 volt rectified output across diode bridge 62. From FIG. 2 it may be ascertained that lines 58 are the lines from pushbutton switch 57 which is closed when conducting link 39b is in place for $CO_2$-MIG welding. Thus, the placement of conducting link 39b over post 39a shorts lines 58 together energizing coil 115 of relay 97 operating same.

In the preferred embodiment, relay 97 has one coil 115 and three double throw poles, one associated with each of control boards 25a-25c (FIG. 1). The particular pole and contacts associated with the control board of FIG. 3 are shown as 96 and 98 thereon. In the drawing, relay 115 is shown in its unenergized position wherein it may be seen that continuity between point 77 and point 85 is maintained through line 95, contact 96 and line 116.

When link 39b (FIG. 1) is inserted to effect the lower voltage output for $CO_2$MIG welding, line 95 becomes connected to contact 98 thus placing resistance 99 in series with the first resistive leg between points 77 and 85. From table of preferred values below, it will be appreciated that the inclusion of resistance 99 in series with the first resistive leg effectively reduces the output voltage by about 25% and thus automatically makes the output level appropriate for $CO_2$MIG welding.

Another advantage of the present invention is that the provision of independent controls for the maximum and minimum settings of each phase provide a simple arrangement for providing a pulsed arc power source using the present invention. Turning for a moment to FIG. 5, a general representation of the output voltage desired for a pulsed arc power source application is shown. From FIG. 5 is may be appreciated that such a pulsed arc arrangement may be made by increasing the voltage output from one phase to the three phase supply while maintaining the remaining two phases at a constant level substantially equal to the voltage level indicated at 129 on FIG. 5.

From inspection of FIG. 3, it will be appreciated that the preferred embodiment of the present invention may be easily adjusted to provide the type of pulsed arc power source output shown in FIG. 5. As is shown in FIG. 1, the maximum and minimum controls 26 and 27 for each of the phases are independently adjustable. Considering FIG. 3 for a moment, it should be noted that adjustment maximum control 26b for one and only one phase to a value of lower resistance (corresponding to higher output voltage) for one particular phase will provide a voltage having a output of the form shown in FIG. 5. It should further be appreciated that the main voltage adjustment potentiometer 80b effects the total resistance in the first resistive leg via the parallel combination of 80b and 27b. It will readily be apparent that when 80b is adjusted for maximum resistance shunting 27b, 80b will dominate and thus the pulses shown in FIG. 5 will tend to represent a lesser percentage of the entire ambient level shown at 129 in FIG. 5. As the resistance provided by 80b decreases (corresponding to increased output voltage), the total resistance of the parallel series combination will begin to be dominated by 26b and thus the height of the output pulses will be increased.

Therefore the present invention provides a simple and easily adjustable arrangement for controlling the output of each individual phase of a multiphase power supply which can be readily set to provide a pulse arc power source.

In order to fully appreciate the structure of the preferred embodiment the following table is provided listing values for the elements shown in FIG. 3 which, when constructed using elements of the values shown below provides the best mode of carrying out the present invention contemplated by the inventor.

| Resistances | |
|---|---|
| No. in Drawing | Value in Kohms |
| 26b | 20 |
| 27b | 100 |
| 70 | 6.8 |
| 71 | 27 |
| 72 | 3.3 |
| 76 | 2 |
| 80b | 25 |
| 81 | .27 |
| 86 | 3.3 |
| 87 | .10 |
| 99 | 2.7 |
| 121 | .10 |
| 127 | .10 |
| 128 | .10 |
| Capacitance | |
| No. in Drawing | Value in Microfarads |
| 82 | .27 |
| 88 | .47 |
| 118 | .047 |

Turning next to FIG. 4, the improved remote control voltage adjustment arrangement of the preferred embodiment of the present invention is shown. Note thereon that a three gang ganged potentiometer having elements 80a–80c is shown with the mechanical ganging being indicated by dashed line 130. It should be understood that ganged element 80b shown in FIG. 4 is the same as element 80b shown in FIG. 3. Also mechanically coupled to gangs 80 is a mechanical wiper 131 having two limit stops 135 and 136 limiting the rotation thereof. Thus it will be appreciated that wiper 131 and limit stops 135 and 136 comprise mechanical stop means for providing limits of the movement of gangs 80.

Dashed line 137 indicates the mechanical coupling between the common ganged shaft of potentiometer elements 80 and a shaft 138 attached to adjustment knob 139. Thus it should be understood that rotation of knob 139 will vary in tandem the values of resistance provided between the wiper and one terminal of gangs 80. Shaft 138 is coupled through a mechanical slip clutch 140 to a shaft 141 of a spur gear 142. The mechanical coupling to shaft 141 is indicated by dashed line 145. Spur gear 142 is connected by a chain 146 which drives a second spur gear 147 having a shaft 148 driven by the output of a motor 150. The mechanical link between shaft 148 and the output of motor 150 is indicated by dashed line 149.

Thus it will be appreciated that rotation of the shaft of motor 150 rotates spur gear 147 which drives chain 146 to rotate gear 142 and ultimately rotates slip clutch 140. Knob 139, through its mechanical link 137 with gangs 80 will cause the values of resistance provided by gangs 80 to change in response to rotation of the shaft of motor 150 within the limit set by stops 135 and 136.

It should be understood that motor 150 may be embodied by any reversible motive driving arrangement and, in the preferred embodiment, is embodied as a split wound AC motor which is reversible. Of course reversible direct current motors and other devices could be used to embody motor 150. The direction of rotation of motor 150 is controlled by a normally open momentary double throw switch shown as 151 which should be understood to be disposed at the remote location under the control of the welder. A generalized source of alternating current is shown as 152 to drive the motor. It will be readily appreciated that operation of switch 151 to connect source 152 to either of the windings of motor 150 will cause the motor to rotate in one of two directions. It will further be appreciated that a similar arrangement for reversing the polarity to the input of a DC motor readily suggests itself to one skilled in the art.

It will therefore be appreciated that from switch 151 at the remote location, the arrangement shown in FIG. 4 will provide a remote control adjustment for adjusting the settings of potentiometers gangs 80a–80c and thus vary the open circuit output voltage from the power supply since it is potentiometer 80 (FIG. 3) which controls the firing angle and thus the nominal output voltage from the supply. Since, as shown in FIG. 4, knob 139 and shaft 138 are mechanically coupled to gangs 80, it will be appreciated that the gangs 80 of this potentiometer comprise a manually adjustable variable control impedance for selectively varying the open circuit voltage of the power supply. It will further be appreciated that slip clutch 140 provides a slip clutch means coupled to the variable control impedance element, gangs 80, and a driving link represented by 145 and shaft 141. Motor 150 comprises a reversible moving means which is coupled to the driving link, shaft 141, which moves the gangs through slip clutch 140. Switch 151 comprises a control means disposed at the remote welding location for controlling motor 150 and for selectively moving it in a first direction and alternately in an opposite second direction.

From the foregoing description of the preferred embodiment, other embodiments of the present invention will suggest themselves to those skilled in the art. Therefore the scope of the present invention is only to be limited by the claims below.

I claim:

1. In a three-phase welding power supply arranged to provide welding current to a remote welding location including a manually-adjustable three-element ganged variable control impedance device for selectively varying the open circuit voltage of said power supply, one of said elements being connected to control a contribution to said open circuit voltage from each respective one of said three phases, the improvement of a remote control arrangement for remotely varying said open circuit voltage comprising in combination:

a set of three independently adjustable variable impedance elements, one each of which is connected to a respective element of said three-element ganged variable controlled impedance for setting limit to said contribution to said open circuit voltage of each said respective one of said three phases;

a slip clutch means coupled to said three element ganged variable impedance device and to a driving link;

a reversible moving means coupled to said driving link for moving said three element ganged variable control impedance device through said slip clutch; and a control means disposed at said remote welding location for controlling said reversible moving means to selectively more said reversible moving means in a first direction and alternately in a second direction opposite said first direction.

2. The improvement of claim 1 wherein said set of three independently adjustable variable impedance elements in a first set of three independently adjustable variable impedance elements, and said limit to said contribution to said open circuit voltage is an upper limit; and further comprising:

a second set of three independently adjustable variable impedance elements, one each of which is connected to a said respective element of said three element gained variable controlled impedance for setting a lower limit to said contribution to said open circuit voltage of each of said respective one of said three phases.

* * * * *